United States Patent [19]

Spriggs et al.

[11] Patent Number: 4,791,486
[45] Date of Patent: Dec. 13, 1988

[54] RECURSIVE IMAGE ENCODING/DECODING USING INTERPOLATION WITHIN VARIABLY SUB-DIVIDED PICTURE AREAS

[75] Inventors: Hugh Spriggs, Ipswich; Charles Nightingale, Felixstowe; Roger D. Turkington, Stowmarket, all of England

[73] Assignee: British Telecommunications Public Limited Company, United Kingdom

[21] Appl. No.: 923,827

[22] PCT Filed: Feb. 3, 1986

[86] PCT No.: PCT/GB86/00060

§ 371 Date: Oct. 1, 1986

§ 102(e) Date: Oct. 1, 1986

[87] PCT Pub. No.: WO86/04757

PCT Pub. Date: Aug. 14, 1986

[30] Foreign Application Priority Data

Feb. 5, 1985 [GB] United Kingdom ................ 8502924

[51] Int. Cl.⁴ .............................................. H04N 7/12
[52] U.S. Cl. .................................... 358/138; 358/133
[58] Field of Search .............. 358/138, 133, 141, 11, 358/12, 135, 136, 260, 280, 262

[56] References Cited

U.S. PATENT DOCUMENTS

| | | | |
|---|---|---|---|
| 2,921,124 | 1/1960 | Graham | 358/138 |
| 4,155,097 | 5/1979 | Lux | 358/138 X |
| 4,205,341 | 5/1980 | Mitsuya et al. | 358/138 X |
| 4,222,076 | 9/1980 | Knowlton | 358/133 X |
| 4,232,338 | 11/1980 | Netraval et al. | 358/136 |
| 4,261,018 | 4/1981 | Knowlton | 358/133 X |
| 4,389,672 | 6/1983 | Bowen et al. | 358/133 X |
| 4,608,600 | 8/1986 | Sugiyamar | 358/133 X |
| 4,654,484 | 3/1987 | Reiffel et al. | 358/133 X |
| 4,675,733 | 6/1987 | Tanimoto | 358/133 X |

OTHER PUBLICATIONS

A. N. Netravali and J. O. Limb, "Picture Coding: A review", Proceedings of the IEEE, vol. 68, No. 3, pp. 366–406, Mar., 1980.

*Primary Examiner*—Howard W. Britton
*Assistant Examiner*—Victor R. Kostak
*Attorney, Agent, or Firm*—Nixon & Vanderhye

[57] ABSTRACT

Actual picture points of a picture area are compared with interpolated values derived from selected points. If the differences are small, data for only the selected points are transmitted, otherwise the area is subdivided and each sub-area processed in the same way, so that the number of points selected for transmission is greatest in detailed areas of the image.

29 Claims, 5 Drawing Sheets

|   | SA | SB | SC | SD |   |        |
|---|----|----|----|----|---|--------|
| 1 | SE | SF | SG | SH | SI | (ABCD) |
| 0 |    |    |    |    |   | (AFEI) |
| 0 |    |    |    |    |   | (FBIG) |
| 1 | SJ | SK | SL | SM | SN | (EICH) |
| 1 | SO | SO | SQ | SR | SS | (EKJN) |
| 0 |    |    |    |    |   | (EPOS) |
| 0 |    |    |    |    |   | (PKSU) |
| 0 |    |    |    |    |   | (OSJR) |
| 0 |    |    |    |    |   | (SQRN) |
| 0 |    |    |    |    |   | (KINL) |
| 0 |    |    |    |    |   | (JNCM) |
| 0 |    |    |    |    |   | (NLMH) |
| 0 |    |    |    |    |   | (IGHD) |

# RECURSIVE IMAGE ENCODING/DECODING USING INTERPOLATION WITHIN VARIABLY SUB-DIVIDED PICTURE AREAS

BACKGROUND OF THE INVENTION

The present invention concerns methods and apparatus for image coding and transmission.

The proposals are suitable for the coding of both still pictures and moving pictures, and are particularly, though not exclusively, aimed at low bit rate video coding schemes for applications such as photovideotex and video conferencing.

They aim to reduce some of the drawbacks associated with transform coding whilst achieving a similar or better compression for a given picture quality.

SUMMARY OF THE INVENTION

According to one aspect of the invention, there is provided a method of image transmission comprising repetitively:
(a) generating an estimate of a picture area by interpolation from selected sample points thereof;
(b) comparing the estimated samples with the actual samples;
(c) if the estimated and actual samples differ by less than a threshold criterion, transmitting picture data in respect of the said selected sample points, and if they do not, notionally dividing the are under consideration into two or more sub-areas and subjecting each sub-area to steps (a), (b) and (c) until a minimum sub-area size is reached.

A transmitter for such transmission may comprise interpolation means for generating an estimate of a picture area based on a subset of its samples, means for comparing the estimate with the actual sample values, and means arranged in dependence on whether the comparison indicates a difference of more or less than a threshold (a) to select the subset of samples for transmission or (b) to notionally divide the picture area into two or more sub-areas and to process each sub-area in like manner.

The subset of samples may be the four corner points of the area, and the interpolation process may be simple two-dimensional linear interpolation, but this is not essential.

The division into sub-areas may conveniently consist of division into four substantially equal parts.

The data transmitted may comprise a sequence of division codes each indicating whether or not the corresponding area is divided; each division code being followed by the codes corresponding to parts of the respective one. In one preferred arrangement the sample point picture data are transmitted in groups of one or more samples, each group containing data in respect of the untransmitted selected sample(s) of a respective area, the sequence of groups being the same as that of the division codes which indicate that the relevant areas are undivided, whilst in another the sample point picture data are transmitted in groups, each group containing data in respect of those selected samples generated by a respective division, the sequence of groups being the same as that of the division codes which indicate the relevant division.

As indicated the invention may be applied directly to the coding of individual pictures. However, further economy in transmission may be combining it with inter-frame differential coding and applying the present coding method being applied to the difference signal (within the predictor loop).

It will be seen that the principle of the method is a non-uniform sample structure in which non-transmitted pels are interpolated.

It is based on the idea of avoiding the use of irrelevant block structures and frequency-derived transforms whose raisons d'etre are inappropriate mathematical models (Markov processes).

BRIEF DESCRIPTION OF THE DRAWING

One embodiment of the invention will now be described with reference to the accompanying drawings, in which.

DESCRIPTION OF THE PREFERRED EMBODIMENT(S)

Operation 1

Figure 1:
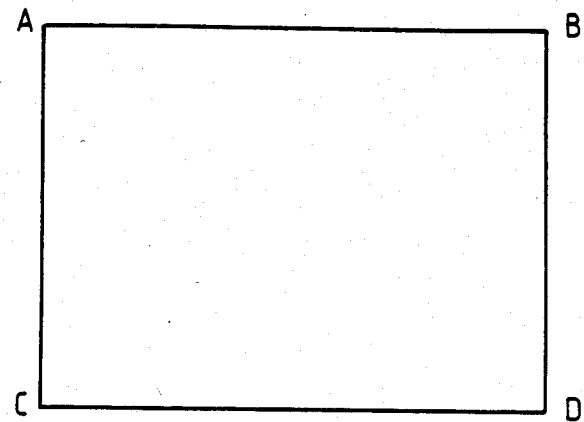
FIG. 1, 2 and 3 illustrate diagrammatically an image area at various stages of the coding procedure.

Referring to FIG. 1, a block whose corner points are ABCD is schematically illustrated. The first step in coding is to calculate a new block in which all picture elements (pels) are represented by values linearly interpolated from the corner values at A, B, C and D. This new block is compared with the original and if no differences are found in excess of a certain threshold, t, then the process moves to operation 2.

Operation 2

The addresses and values of the points A, B, C and D are transmitted. In the receiver the whole block can be reconstructed by interpolation from these points in the knowledge that the resulting block will be a good approximation to the original. If the picture includes more than one block the process then moves to a new block and repeats operation 1. Although the process may be started with the full frame as the first block so that large inactive blocks may be and often are transmitted, the process could, of course, start from an initial sub-division.

In the case that differences found during operation 1 exceed the threshold t then operation 3 is performed.

Operation 3

Figure 2:
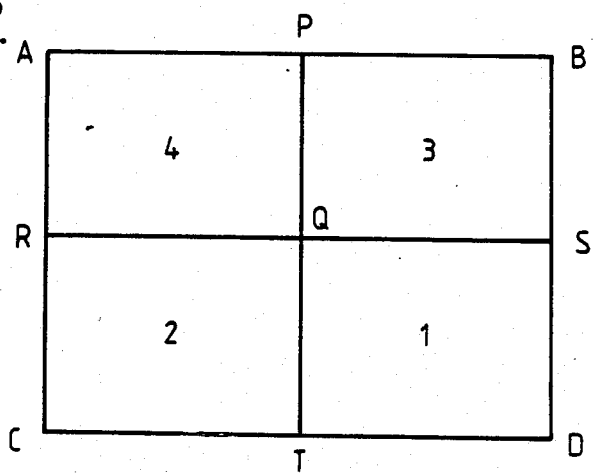

The block ABCD is subdivided as shown in FIG. 2 and one of the newly obtained subblocks, APQR for example, is selected to repeat the process from operation 1.

Figure 3:
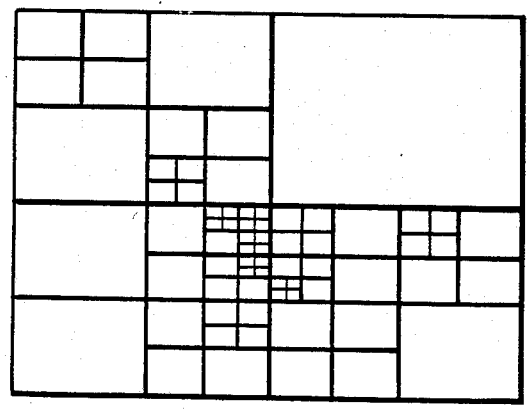

As the process proceeds a structure like that shown in FIG. 3 will appear where the greatest number of subdivisions wil occur at edges or over fine detail.

The process may continue until sub-division is no longer necessary, or no longer possible, but if desired a minimum block size may be defined.

It may be supposed that the addressing overhead for such a scheme would be very large, even prohibitive, but this is not the case, and a system which fully expoints the highly recursive nature of the process and reduces the address data to approximately one bit per corner point will now be described.

Starting with the full frame ABCD (FIG. 1), the addresses of the corner points are known in advance by the receiver (or are transmitted if not known in advance). Operation 1 is then carried out. If it is decided that the block can be interpolated from its corner values, a "0" is transmitted. If it is decided that the block must be sub-divided, a "1" is transmitted. The block is sub-divided into four by cutting it in half horizontally and vertically. Therefore the transmission of the "1" is sufficient to determine the addresses of the five new points needed in the sub-division. (The lengths of the sides of the block do not need to be powers of 2, provided the receiver and transmitter use the same rule for dividing odd numbers by 2). The addresses of the corner points of the four new blocks are placed on a "stack" in a predetermined order (eg as indicated by "4, 3, 2, 1" in FIG. 2, where 4 is at the top of the stack). Each layer of the stack consists of information on one block, its corner points and the values at those points.

The block at the top of the stack is now processed in exactly the same way. If the block can be interpolated then it is simply removed from the stack and the next block down in processed. If it has to be sub-divided it is removed from the stack and replaced by the four new blocks.

The receiver can work out, from the "0"'s and "1"'s which are transmitted as above, the addresses of all the sample points and the order in which they are to be received. It works out that this addressing information is approximately one bit per sample point.

Transmission of the actual sample data may be interspersed with the 1/10 sub-division information sequence, or may follow it. It will be appreciated that the addressing scheme described establishes an order of priority of the blocks, and sample data conveniently can follow this order.

One possible method would be to transmit sample data for the corners of each block not sub-divided, (ie a set of data for each "0" of the sequence).

In many instances each block will abut blocks to the left and above it (with the stack priority sequence given) whose data have already been transmitted—or implied—and thus only one sample value, the bottom left-hand corner, needs to be sent.

Alternatively, data may be regarded as associated with the act of dividing a block into four ie one set of data for each "1" of the sequence. This implies that A, B, C, D, have already been sent and that P, Q, R, S, T are required, though P and R will usually have been sent (or interpolated at the receiver) as S or T of a preceding block.

Figure 4:
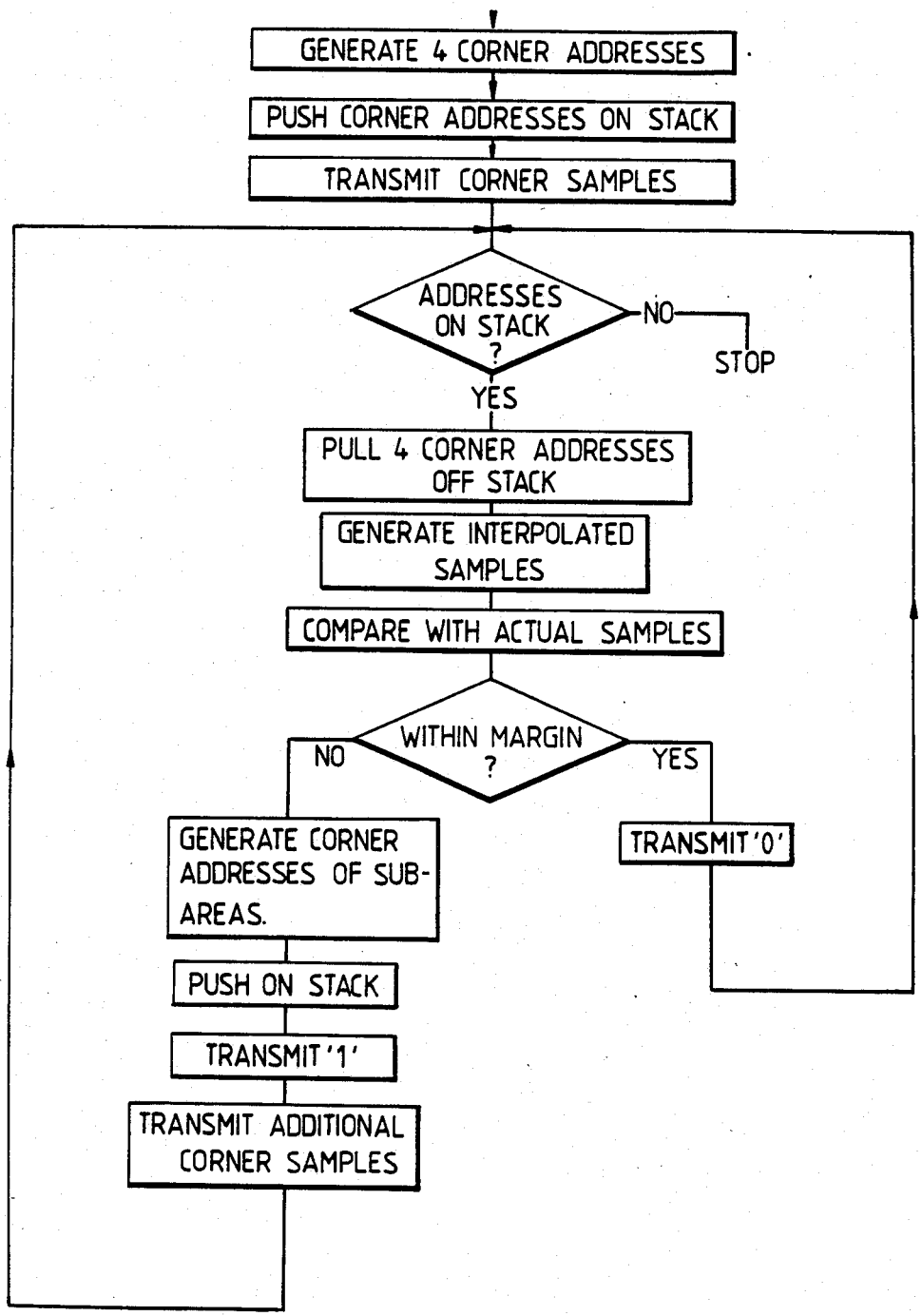
FIG. 4 is a flowchart for coder operation.

A transmitter for coding in accordance with these methods may comprise a frame store, means to enter image samples and processing means arranged to perform the coding. A flowchart for carrying out the second sequence mentioned above is shown in FIG. 4. This could be carried out by a suitably programmed microprocessor, though for real-time processing of moving pictures, dedicated hardware would probably be necessary to achieve the desired speed of operation.

Figure 5:
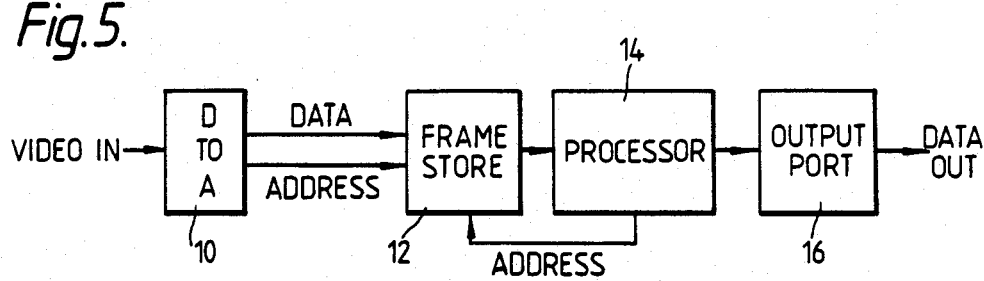
FIG. 5 is a block diagram of a coder.

FIG. 5 shows a coder with digital to analogue converter 10 (with address control), frame store 12, processor 14 and data output port 16.

Figure 6:
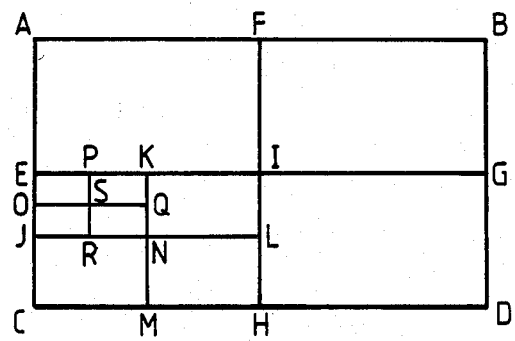
FIG. 6 is a flowchart for decoder operation.

FIG. 6 shows an image area, together with the resulting coded output. SA, SB etc. indicate sample values corresponding to points A, B etc. Letters in brackets indicate the areas to which the division codes 1, 0 correspond; this information does not, however have to be transmitted since it can be deduced by the receiver.

Figure 7:
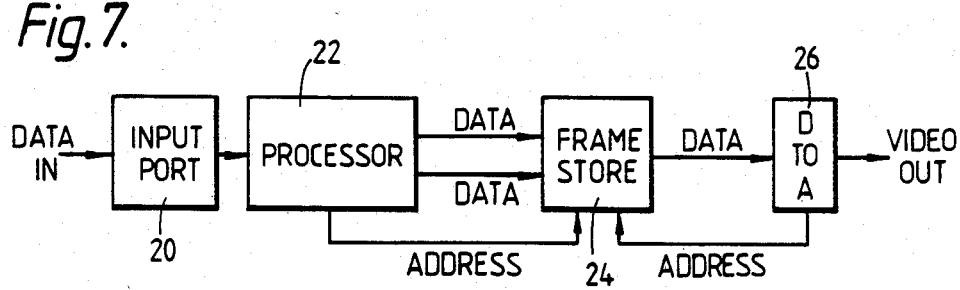
FIG. 7 is a block diagram of a decoder.
Figure 8:
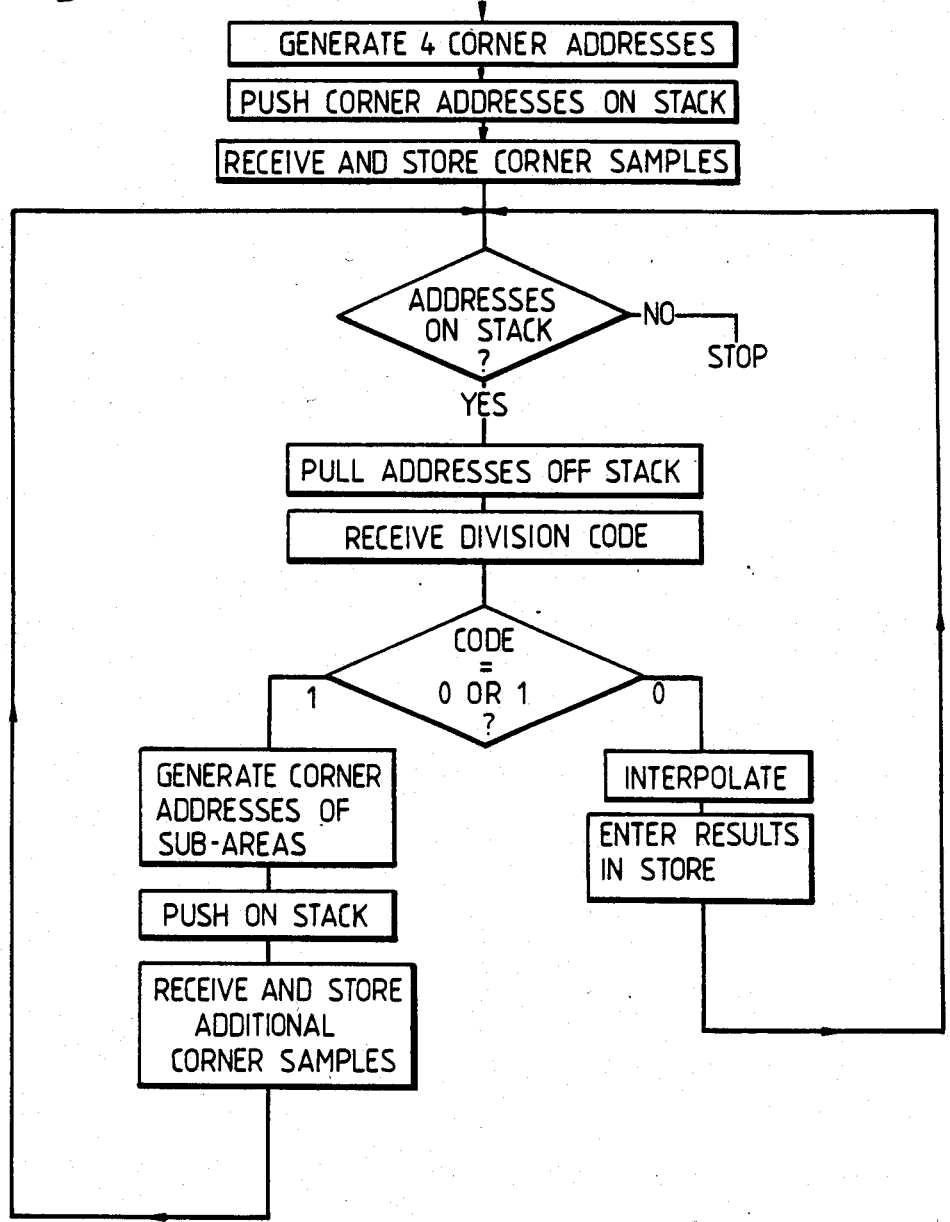
FIG. 8 illustrates a typical coder sequence.

FIG. 7 shows a receiver with data input port 20, processor 22, frame store 24 and output D to A converter (and address control) 26. Receiver operation is illustrated in the flowchart of FIG. 8.

There are a number of methods of achieving and/or varying the degree of compression.
(a) The threshold may be increased so that larger blocks will be found to satisfy the criterion for transmission. This leads to fewer blocks and hence fewer corner points to be transmitted.
(b) The minimum allowable block size can be increased to prevent a myriad of very small blocks from being generated with consequent saving on transmitted points.
(c) The number of bits used to represent a transmitted corner value can be reduced since contouring (sudden steps in brightness) is impossible with a scheme based on interpolation.
(d) Some values may not need to be transmitted since they can be interpolated from already transmitted values.
(e) Other transmitted actual values can be replaced by differences between actual and interpolated values with consequent reduction of variance and decrease in the number of bits required for transmission of some corner points.

Apart from (d) these all introduce some degradation in picture quality, and their application must be tempered with the experience of practice. Because of the novel nature of the scheme the types of degradation seen are themselves novel and their subjective effects and their effects on interframe coding are not yet well understood.

By way of clarification of possibilities (d) and (e) above, there follows a description of such a differential coding method. When it has been decided that the block ABCD must be sub-divided, the values of five (but usually three) new points are required. Each of the new points is tested to see whether its value can be approximated by interpolation from points already known; eg the interpolation value at P is midway between the values at A and B. If the interpolation is sufficiently accurate a "0" is transmitted. If it is not sufficiently accurate a "1" is transmitted, followed by the actual value, suitably coded. At present the preferred coding scheme is to transmit the difference between the actual value and the interpolated value. This normally gives a distribution of values with a small variance centred around zero, and therefore entropy coding can be used to reduce the average number of bits needed to be transmitted per sample value.

At the receiver it is simply necessary to calculate the interpolation for each sub-area transmitted, the sample values within that area, and enter the values into a frame store which, when the entire picture has been built up in this way, can then be read out.

Figure 9:
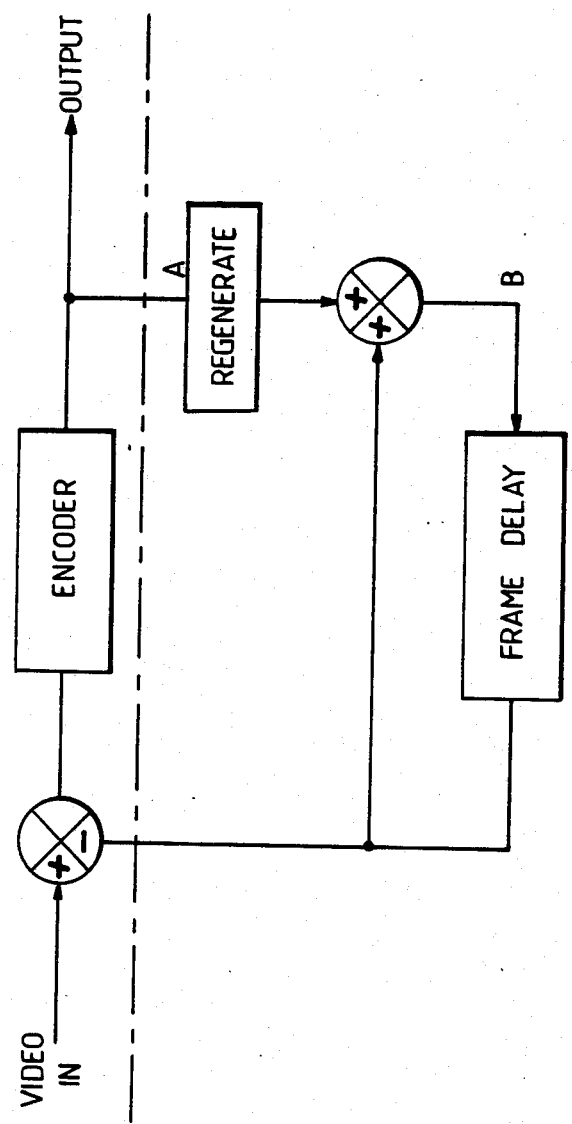
FIG. 9 is a block diagram of an inter-frame coder.

FIG. 9 shows a block diagram of a transmitter for transmitting inter-frame differences using the proposed method, the encoder and regenerator operating as described above. That part of the circuit below the dotted line is in fact a receiver (input A, output B). At the transmitter, in fact, the interpolated signals could be extracted from the encoder rather than generated by a regenerator.

We claim:
1. A method of image transmission comprising repetitively:

(a) generating an estimate of a picture area by interpolation from selected actual samples thereof to provide estimated samples;
(b) comparing the estimated samples with the actual samples; and
(c) if the estimated and actual samples differ by less than a threshold criterion, transmitting picture data representing the said actual samples, and if they do not, notionally dividing the area under consideration into two or more sub-areas and subjecting each sub-area to steps (a), (b) and (c) until a minimum sub-area size is reached.

2. A method according to claim 1 in which the said area and sub-areas are rectangular or square and the estimate is generated by a two-dimensional interpolation process based on the four corner points of the square or rectangular area.

3. A method according to claim 1 or 2 in which, in step (c), the notional division of the area is into four substantially equal parts.

4. A method according to claim 1 or 2 in which the picture data transmitted representing the selected actual samples after the first sample are the differences between the actual sample values and the corresponding estimated values.

5. A method according to any one of claims 1 or 2 in which the data transmitted comprises a sequence of division codes, each indicating whether or not the corresponding area is divided; each division code being followed by the codes corresponding to parts of the respective area.

6. A method according to any one of claims 1 or 2 in which the said actual samples being transmitted represent the differences between samples of the picture to be transmitted and those of a previously transmitted picture.

7. An apparatus for carrying out a method of image transmission comprising:
an interpolation means for generating an estimate of a picture area based on interpolation from a subset of its actual samples,
means for comparing the estimate with actual sample values, and
means arranged in dependence on whether the comparison indicates a difference of more or less than a threshold (a) to elect the subset of actual samples for transmission or (b) to notionally divide the picture area into two or more sub-areas and to process each sub-area in like manner.

8. An apparatus according to claim 7 in which the said area and sub-areas are rectangular or square and the estimate is generated by a two-dimensional interpolation process based on the four corner points of the square or rectangular area.

9. An apparatus according to claim 7 or 8 in which, in step (c), the notional division of the area is into four substantially equal parts.

10. An apparatus according to claim 7, or 8 in which the picture data transmitted representing the selected actual samples after the first are the differences between the actual sample values and the corresponding estimated values.

11. An apparatus according to any one of claims 7 or 8 in which the data transmitted comprises a sequence of division codes each indicating whether or not the corresponding area is divided; each division code being followed by the codes corresponding to parts of the respective one.

12. An apparatus for image transmission comprising:
means for generating differences between current image actual samples and actual samples of a previously transmitted image, comprising apparatus according to any one of claims 7 or 8 for encoding the said differences.

13. A decoder for receiving an image encoded by repetitively (a) generating an estimate of a picture area by interpolation from selected actual samples thereof to provide estimated samples, (b) comparing the estimated samples with the actual samples, and (c) if the estimated and actual samples differ by less than a threshold criterion, transmitting picture data representing the said actual samples, and if they do not, notionally dividing the area under consideration into two or more sub-areas and subjecting each sub-area to steps (a), (b) and (c) until a minimum sub-area size is reached, said decoder comprising:
a frame store,
processing means arranged to compute from received division codes the addresses of image points for which data is transmitted and to interpolate values for the remaining points.

14. A method for transmitting an image having a plurality of picture elements, the method comprising the steps of repetitively:
(a) receiving actual sample values representing respective picture elements;
(b) generating an estimate of a picture area by interpolation from selected ones of said actual sample values for that area to produce estimated sample values for the remainder of the picture elements of that area;
(c) comparing said estimated sample values with the actual sample values corresponding to the same elements to ascertain whether they meet a threshold criterion requiring that the differences between estimated and actual values be small; and
(d) if the criterion is met, transmitting picture data indicative of the values of said selected ones of said actual sample values, and if the criterion is not met and the picture area under consideration has not reached a minimum sub-area size, notionally dividing said area into two or more sub-areas, information as to such division being transmitted, and subjecting each sub-area to steps (b), (c) and (d).

15. A method according to claim 14 in which said area and sub-areas are rectangular or square and said selected ones of said actual sample values are those representing picture elements at the four corner points of the square or rectangular area, said estimated sample values being generated by a two-dimensional interpolation process.

16. A method according to claim 15 in which, in step (d), said notional division of the area is into four substantially equal parts.

17. A method according to claim 14, 15 or 16 in which said picture data transmitted for the selected sample values of a sub-area are the differences between the actual sample values and the estimated sample values.

18. A method according to claim 14, 15 or 16 in which the data transmitted comprise a sequence of division codes each indicating whether or not the corresponding area is divided; each division code being followed by division codes corresponding to parts of the respective area.

19. A method according to claim 14, 15 or 16 in which the said actual sample values represent the differences between picture elements of the image to be transmitted and those of a previously transmitted image.

20. An apparatus for transmission of an image including a plurality of picture elements, said apparatus:
  (a) interpolation means for receiving actual sample values representing respective picture elements and generating an estimate of a picture area by interpolation from selected ones of said actual sample values for that area to produce estimated sample values for the remainder of the picture elements of that area;
  (b) means for comparing said estimated sample values with the actual sample values corresponding to the same elements to ascertain whether they meet a threshold criterion requiring that the differences between estimated and actual values be small; and
  (c) means arranged in dependence on whether the criterion respectively is or is not met (i) to transmit picture data indicative of the values of said selected ones of said actual sample values, or (ii) subject to a minimum sub-area size, to notionally divide said area into two or more sub-areas and process each sub-area in like manner.

21. An apparatus according to claim 20 in which said area and sub-areas are rectangular or square and said selected ones of said actual sample values are those representing picture elements at the four corner points of the square or rectangular area, said estimation means being arranged to perform a two-dimensional interpolation process based on those corner points.

22. An apparatus according to claim 20 or 21 in which said notional division of the area is into four substantially equal parts.

23. An apparatus according to claim 20 or 21 in which said picture data transmitted for said selected sample values of a sub-area are the differences between the actual sample values and the estimated sample values.

24. An apparatus according to claim 20 or 21 in which the data transmitted comprise a sequence of division codes each indicating whether or not the corresponding area is divided; each division code being followed by division codes corresponding to parts of the respective area.

25. An apparatus according to claim 20 or 21 further including means for generating said actual sample values by forming differences between picture elements of the image to be transmitted and those of a previously transmitted image.

26. An image decoding apparatus comprising:
  input means for receiving division codes indicating whether an image area and sub-areas of that area are divided, or further divided, into sub-areas, and for receiving actual sample values representing selected picture elements of the image;
  frame store means;
  processing means arranged to compute, from the received division codes, the addresses within the frame store corresponding to the received actual sample values and to store those values in the frame store; and
  interpolation means arranged to interpolate, from the received values, estimated sample values for the remaining elements of the image and to store them in the frame store.

27. A method for encoding and transmitting condensed image data representing a full multi-dimensional array of pixels having individual actual values and address-defined relative locations, said method comprising the steps of:
  (a) dividing said array into groups of contiguous pixels and selecting certain pixels of the array, said selected pixels and the sizes of said groups being chosen such that the pixels of each group have actual values which can be derived within a predetermined error threshold by interpolation from the actual values of ones of said selected pixels ;and
  (b) transmitting as said condensed image data information representing the actual values and addresses of said selected pixels.

28. A method as in claim 27 wherein said selected pixels are located at the boundaries of said groups of pixels.

29. A method for decoding compressed image data representing a full multi-dimensional array of pixels having individual actual values and address-defined relative locations, said method comprising the steps of:
  (a) identifying from said compressed image data the actual values and address locations of a predetermined first plurality of pixels in said array located to define differently sized contiguous groups of pixels having actual values which can be derived within a predetermined error threshold by interpolation from the actual values of said first plurality of pixels; and
  (b) deriving by interpolation from the values and relative locations of said first plurality of pixels approximated values for the remaining plurality of pixels in said array.

* * * * *